United States Patent
Nesbit et al.

(10) Patent No.: US 6,402,635 B1
(45) Date of Patent: Jun. 11, 2002

(54) APPARATUS AND METHOD FOR MEASURING REACTION FORCES AND WEIGHT SHIFTS

(75) Inventors: Steven M. Nesbit, Easton, PA (US); Terry A. Hartzell, Madison, WI (US); Anthony Shea, Wethersfield, CT (US); Michael Tracey, Arlington, VA (US); Lucien Webb, Rumson, NJ (US)

(73) Assignee: U. S. Golf Association, Far Hills, NJ (US)

(*) Notice: Subject to any disclaimer, the term of this patent is extended or adjusted under 35 U.S.C. 154(b) by 0 days.

(21) Appl. No.: 08/386,064

(22) Filed: Feb. 9, 1995

(51) Int. Cl.[7] .............................. A63B 69/00; G01B 7/16
(52) U.S. Cl. ..................... 473/269; 473/131; 73/763; 73/488; 73/862.622; 73/862.628; 73/862.637
(58) Field of Search ........................ 364/508, 571.1, 364/571.02, 571.05; 33/508; 434/252; 73/584.763, 1 B, 488, 862.622, 862.628, 862.627, 862.632, 862.634, 862.637, 862.639, 862.041, 862.044, 862.045; 473/266, 269, 131, 341; 29/898.03, 898.04, 898.06, 898.054, 898.041, 724; 177/211, 229

(56) References Cited

U.S. PATENT DOCUMENTS

| | | | | |
|---|---|---|---|---|
| 4,366,874 A | * | 1/1983 | Pidoux et al. ................ 177/25 |
| 4,574,899 A | * | 3/1986 | Griffin ......................... 177/211 |
| 4,799,302 A | * | 1/1989 | Yokota ....................... 29/148.4 |
| 4,884,223 A | * | 11/1989 | Ingle et al. ................. 364/550 |
| 5,118,112 A | * | 6/1992 | Bregman et al. ......... 273/183 A |
| 5,150,902 A | * | 9/1992 | Heisler .................... 273/186.1 |
| 5,419,562 A | * | 5/1995 | Cromarty ................. 273/183.1 |

* cited by examiner

Primary Examiner—Hyung-Sub Sough
(74) Attorney, Agent, or Firm—Francis C. Hand, Esq.; Carella Byrne et al.

(57) ABSTRACT

The force plate data acquisition system measures, processes and analyzes the vertical reaction forces and various weight shifts between the ground and a golfer's feet during a swing. Plates are supported on cantilever beams through ball bearings. The beams are attached to a rigid frame and instrumented with strain gauges configured in a Wheatstone half bridge arrangement. An eight-channel strain gauge data acquisition board in a central processing unit records strain information. Data collection can be independent or controlled by a motion analysis system to provide synchronous foot force and video information. A set of BASIC programs collect strain readings from the foot plates, process the data, relate beam deflections to applied load and plots reaction force and weight shift information to the computer screen. Graphs produced are total vertical reaction force, foot-to-foot weight shift, heel-to-toe weight shift, outside-to-instep weight shift and the speeds of each. The data can be normalized for comparison purposes.

12 Claims, 20 Drawing Sheets

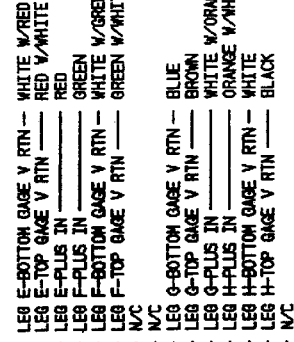
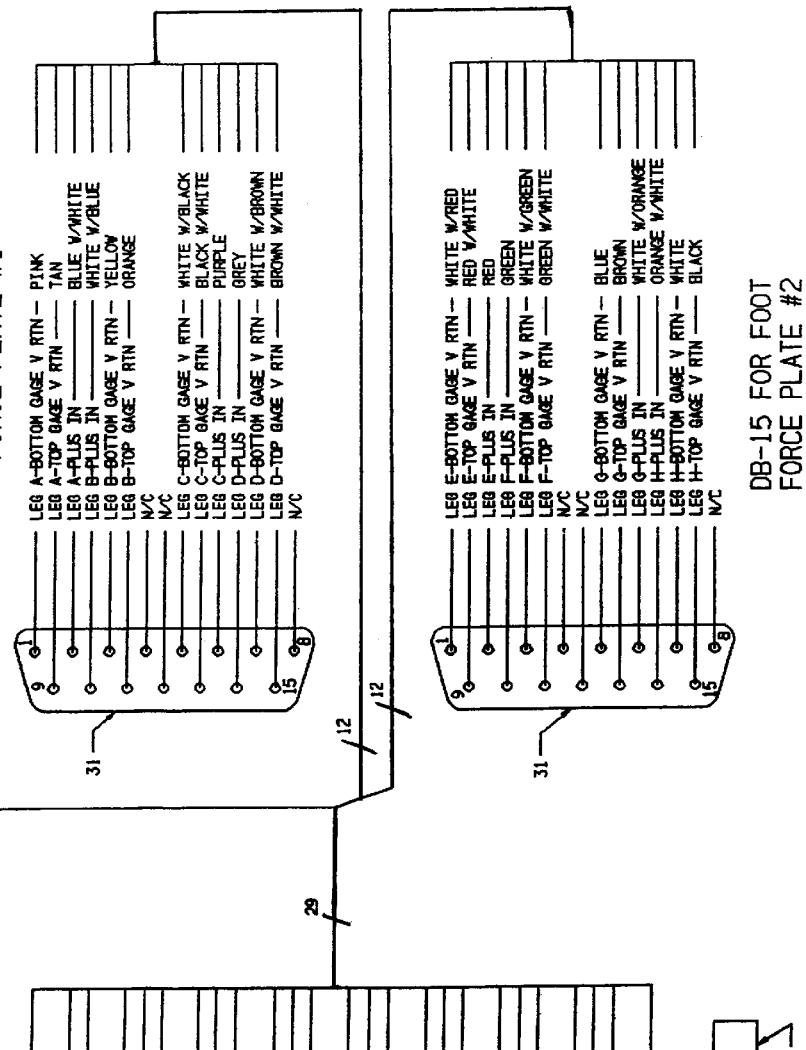
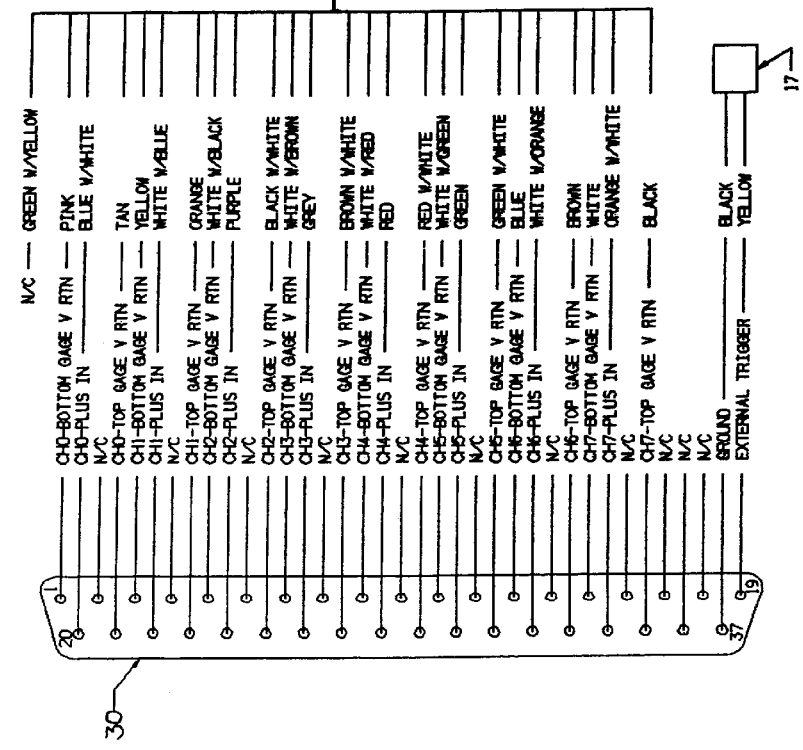
FIGURE 5

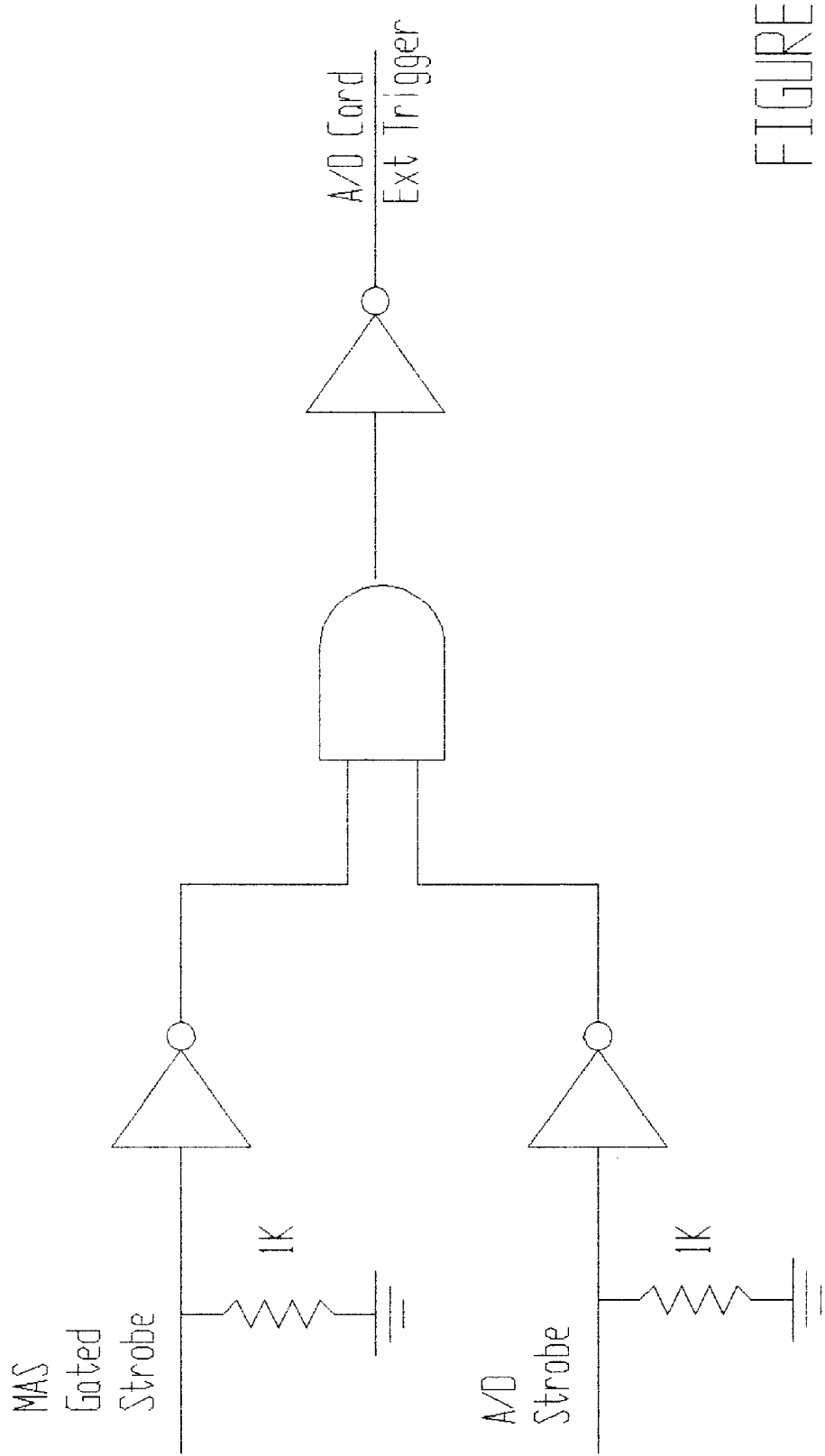

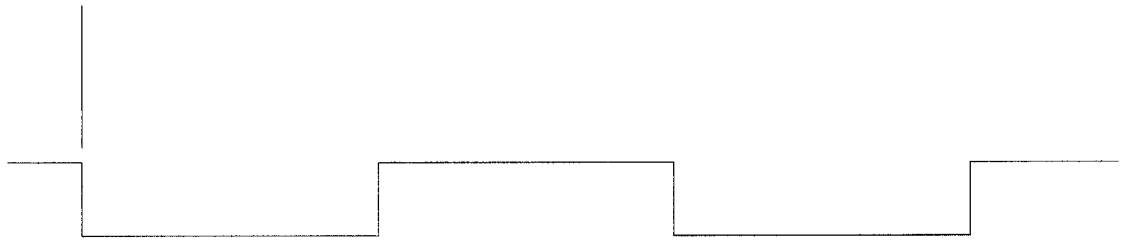
FIGURE 7a. A/D GATED STROBE (180 Hz)
← MOTION ANALYSIS SYSTEM
  STARTS RECORDING SWING
FIGURE 7b. A/D STROBE (1800 Hz)
FIGURE 7c. SYNC CICUIT OUTPUT

APPARATUS AND METHOD FOR MEASURING REACTION FORCES AND WEIGHT SHIFTS

This invention relates to an apparatus and method for measuring reaction forces and weight shifts. More particularly, this invention relates to an apparatus and method for measuring vertical ground reaction forces and weight shifts produced by a golfer during a golf swing.

As is known, various techniques have been employed for measuring and analyzing the vertical ground reaction forces produced during the swing of a golfer. This data has been used for the following purposes; 1) to understand the interaction forces between the ground and the golfer during a swing, 2) to provide a method of comparison between golfers in order to analyze and/or adjust the swing to some type of ideal swing, and 3) to provide relevant data for the design and evaluation of golf equipment.

For example, in a copending application, there is a description of a motion analysis system and associated computer model for analyzing a golf swing which is able to measure the vertical ground reaction forces caused by a golfer during a swing in order to serve as a control for the analysis operation of the computer model.

As is known by golfers and those who instruct in golf, there is a considerable shifting of weight during a swing even though there is no change in the overall position of the feet. For example, a purposeful shifting of the weight between the feet must occur in order to generate maximum swing power. Also, local weight shifting through foot movements in both the heel-to-toe and outside-to-instep directions is an important component of the overall golf swing. Providing this information in addition to measured ground reaction forces would improve the ability to meet the objectives mentioned above.

However, it has not been known that any attempt has been made to configure a device that simultaneously measures the vertical ground reaction forces, foot-to-foot weight shifts, and local weight shifts from foot movements, for example, from heel-to-toe and/or from outside-to-instep, during a golf swing.

Accordingly, it is an object of the invention to provide a method of accurately measuring the foot-to-foot weight shifts during a golf swing.

It is another object of this invention to provide a method of accurately measuring heel-to-toe weight shifts during a golf swing.

It is another object of this invention to provide a method of accurately measuring outside-to-instep weight shifts during a golf swing.

It is another object of this invention to be able to combine the ability to accurately measure weight shifts with the ability to accurately measure the vertical reaction forces during a golf swing.

It is another object of this invention to be able to measure the rate of change of vertical reaction forces and foot-to-foot, heel-to-toe, and outside-to-instep weight shifts over time during a golf swing.

It is another object of this invention to provide an analytical method of evaluating golf swings using reaction force and weight shift information.

It is another object of this invention to analyze a golf swing using synchronized foot force and video data.

It is another object of this invention that the system be easy to operate, unobtrusive to the golfer, and provide quick and meaningful feedback.

It is another object of the invention to be able to compare golf swings based upon reaction force and weight shift characteristics.

It is another object of the invention to be able to evaluate golf equipment based upon the reaction force and weight shift characteristics of a golfer.

It is another object of the invention to comprehensively analyze the biomechanics of a golf swing and the effects of equipment on a golfer.

Briefly, the invention provides an apparatus for measuring vertical ground reaction forces which comprises a pair of force plates upon which a golfer is positioned during a golf swing. Each force plate is constructed to react not only to the downward forces of a golfer but also to shifts in the golfer's weight. To this end, each force plate has a rigid frame, a pair of beams mounted on the frame in cantilevered manner at each of two opposite sides of the frame with each pair of beams extending from one side of the frame toward the opposite side of the frame. In addition, a plurality of ball bearings are provided with each ball bearing disposed on a free end of a respective beam while a plate is mounted on the ball bearings and extends over the beams so as to receive a load, for example, the foot of a golfer. The construction of each foot plate is such that a downward load on the plate causes the beams to deflect.

The apparatus also includes sensing means adjacent each beam for sensing a deflection of the beam and for emitting a voltage signal indicative of the sensed deflection. This sensing means may be in the form of strain gauges for measuring the deflection of a beam under a load. In a preferred embodiment, a pair of strain gauges are disposed at each beam with one strain gauge disposed below the beam and the other strain gauge disposed above the beam arranged such that they measure temperature insensitive deflection.

The apparatus also employs a processing unit which is connected to the sensing means to receive voltage signals therefrom in order to calculate reaction forces corresponding thereto. This processing unit includes a data acquisition board which is connected to each sensing means for receiving the voltage signals. The board also includes a plurality of analog/digital converters for transforming the voltage signals into binary numbers and a BASIC program connected with the converters to calibrate the binary numbers to reaction forces. The processing unit also includes a means to process the beam reaction force data to determine total vertical reaction forces, foot-to-foot weight shift, heel-to-toe weight shift, and outside-to-instep weight shift. The processing unit also includes a means to determine the speed at which the vertical reaction forces and weight shifts take place.

Still further, the apparatus includes a monitor which is connected to the processing unit for graphically displaying combinations of the beam reaction forces per unit of time to visually indicate at least one of a total vertical reaction force of the golfer, foot-to-foot weight shift of the golfer between the two plates, a heel-to-toe weight shift of the golfer's feet, and an outside-to-instep weight shift of the golfer's feet over time.

For example, the monitor may be used for graphically displaying the sum of the beam reaction forces of each force plate per unit of time in order to visually indicate a foot-to-foot weight shift over time between the two foot plates.

The monitor may also be used to graphically display a quantity indicative of the movement of the location of the vertical reaction force in the heel-to-toe direction as sensed by the difference in the sum of the beam reaction forces of one pair of beams relative to the opposite pair of beams of each foot plate so as to visually indicate a heel-to-toe weight shift on each foot plate over time.

Likewise, the monitor may be used to graphically display a quantity indicative of the movement of the location of the vertical reaction force in the outside-to-instep direction as sensed by the difference in the sum of the beam reaction forces on one pair of opposed beams relative to the other pair of opposed beams of each foot plate per unit of time to visually indicate an outside-to-instep weight shift on each foot plate over time.

The invention also provides a method of measuring ground reaction forces in the vertical direction during a golf swing. In this regard, the method includes the step of positioning a golfer on a pair of plates wherein each plate is supported at two pairs of points at opposite ends of the plate to transfer the weight of a golfer's foot thereto during a golf swing. The points of support may be defined as movable points, such as a point on the free end of a cantilevered beam. In accordance with the method, the movement or deflection of each point is sensed during a golf swing and a vertical reaction force for each point corresponding to the deflection is calculated.

In accordance with the invention, a graphic display is made of combinations of the beam reaction forces per unit of time to visually indicate at least one of a total vertical reaction force of the golfer, foot-to-foot weight shift of the golfer, the heel-to-toe weight shift of the golfer on each plate, and an outside-to-instep weight shift of the golfer on each plate over time. Still further, the rate of change of a respective one of the reaction forces and weight shifts over time may also be graphically plotted.

These and other objects and advantages of the invention will become more apparent from the following description taken in conjunction with the accompanying drawings wherein.

Figure 1:
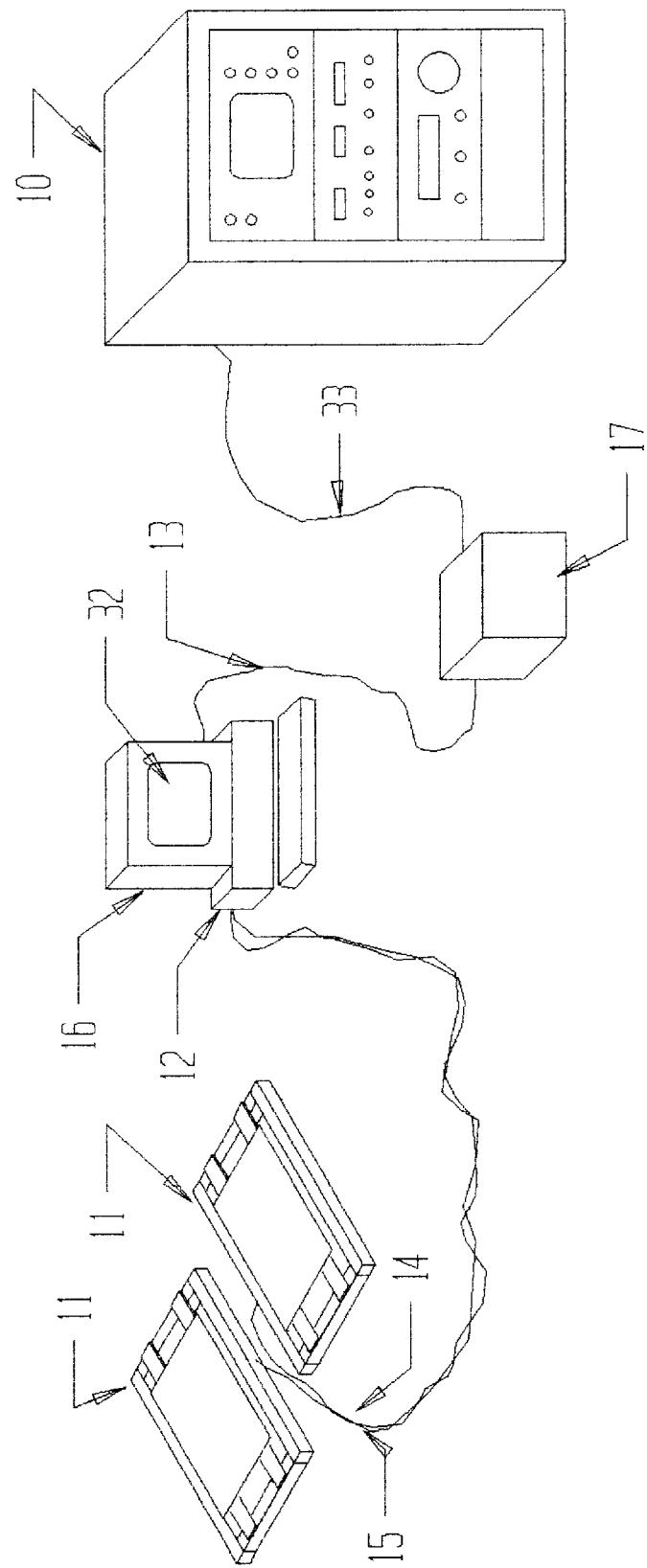
FIG. 1 illustrates a system for analyzing a golf swing employing a force plate data acquisition system in accordance with the invention.
Figure 2:
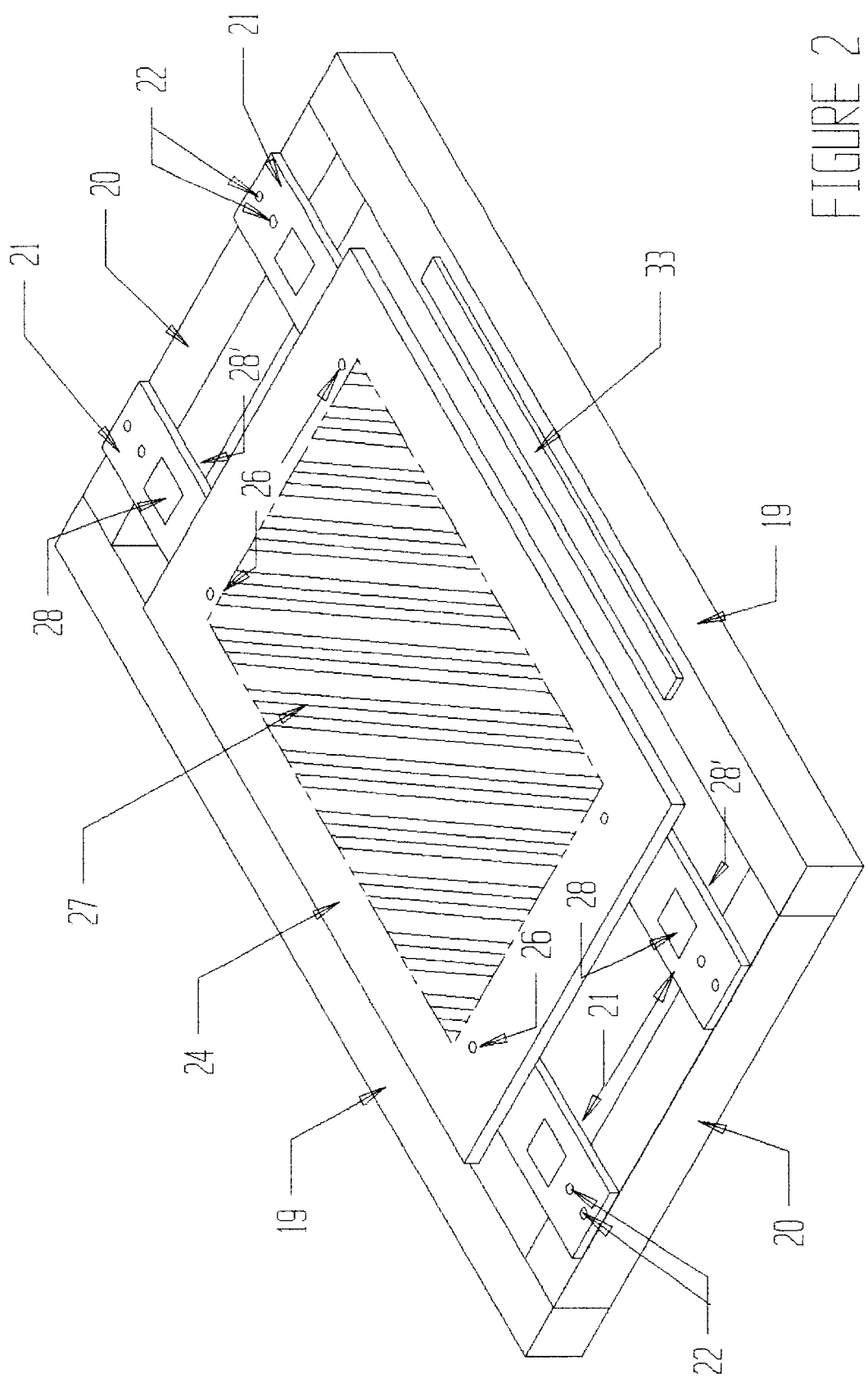
FIG. 2 illustrates a perspective view of a force plate of FIG. 1.
Figure 8:
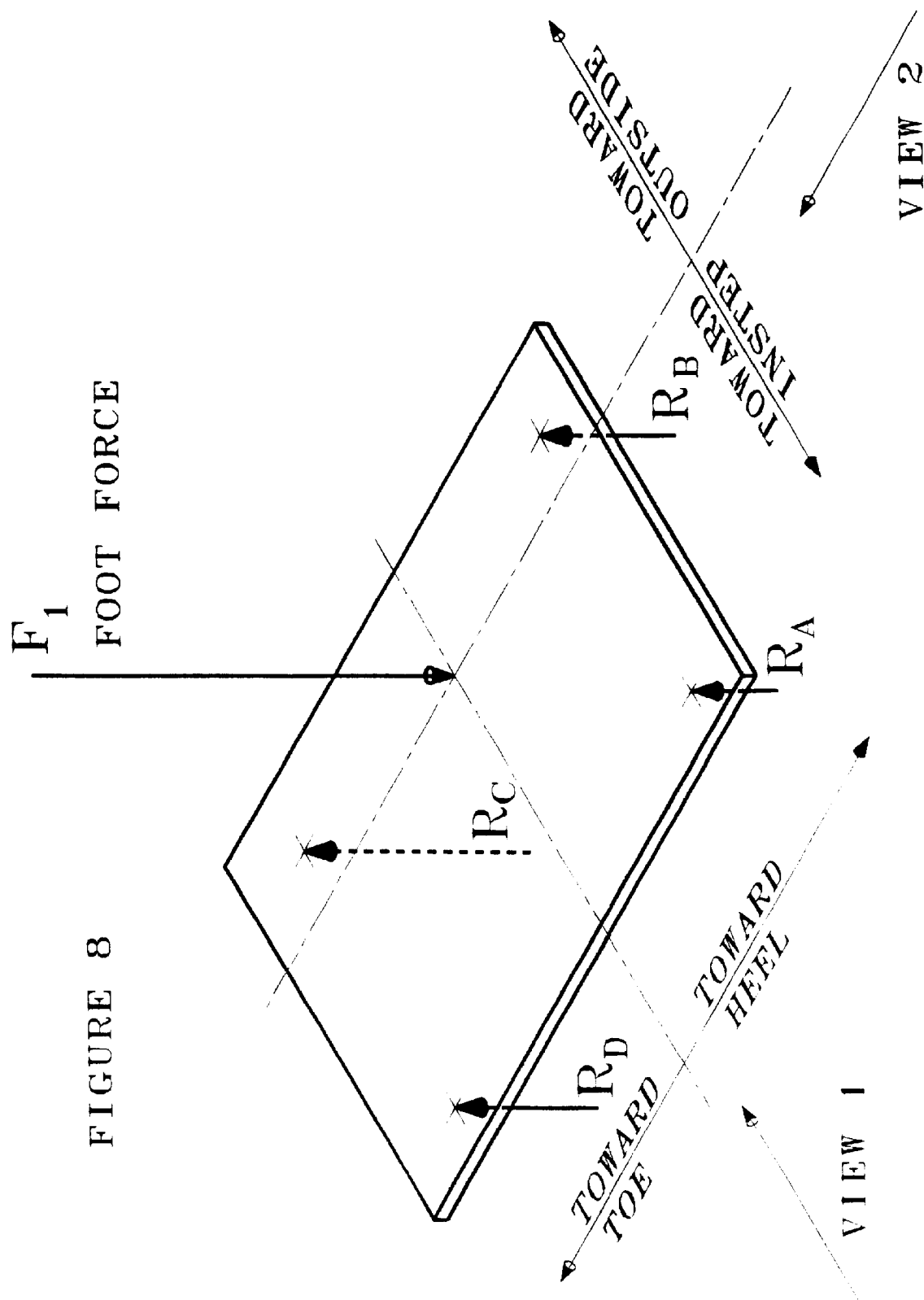
Figure 9:
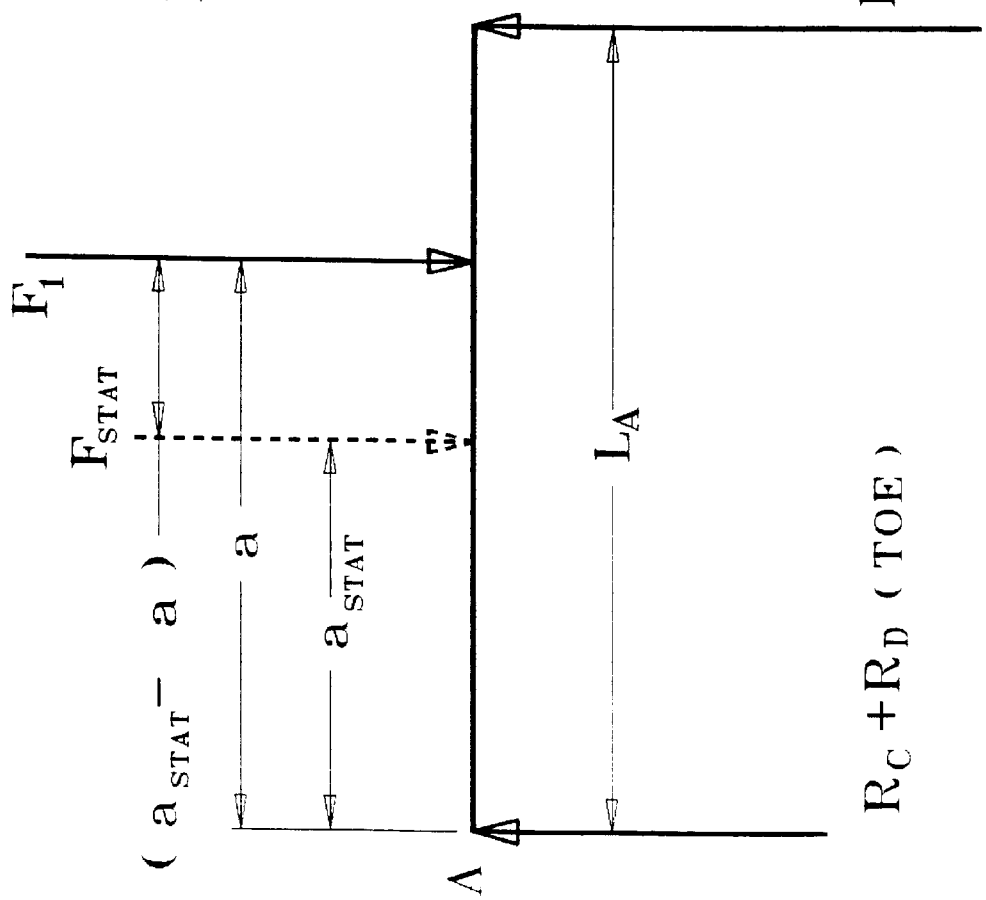
Figure 10:
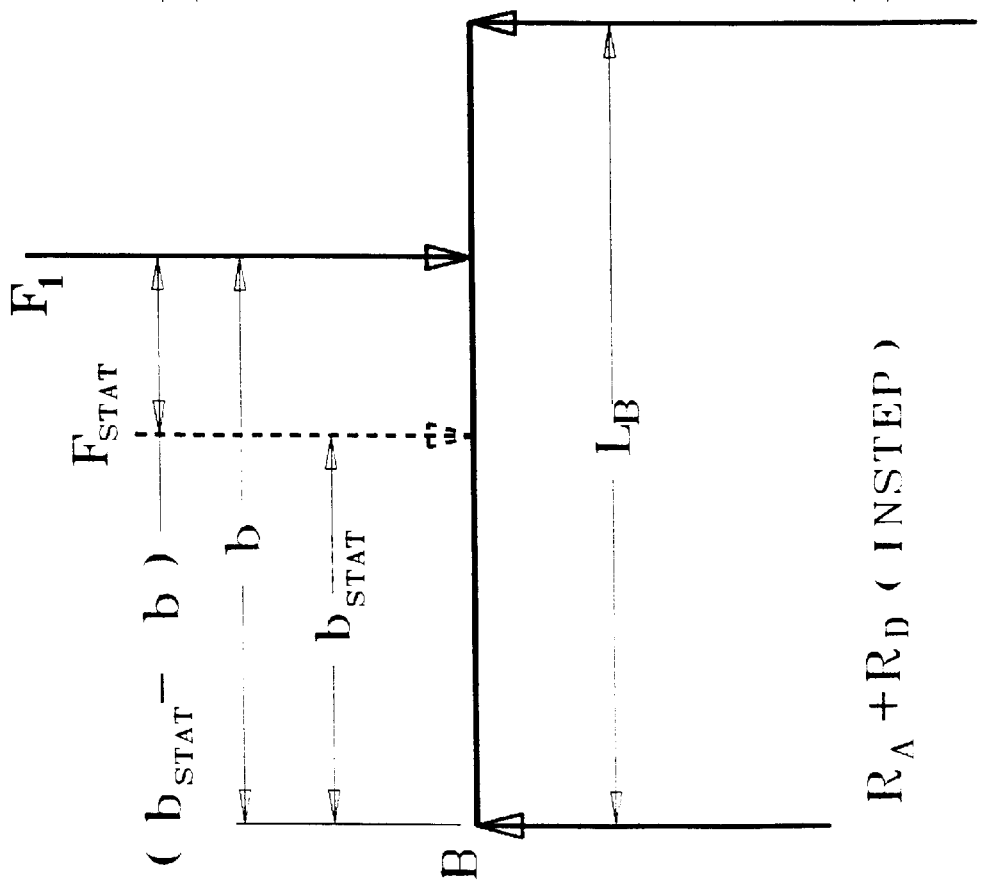
Figure 11:
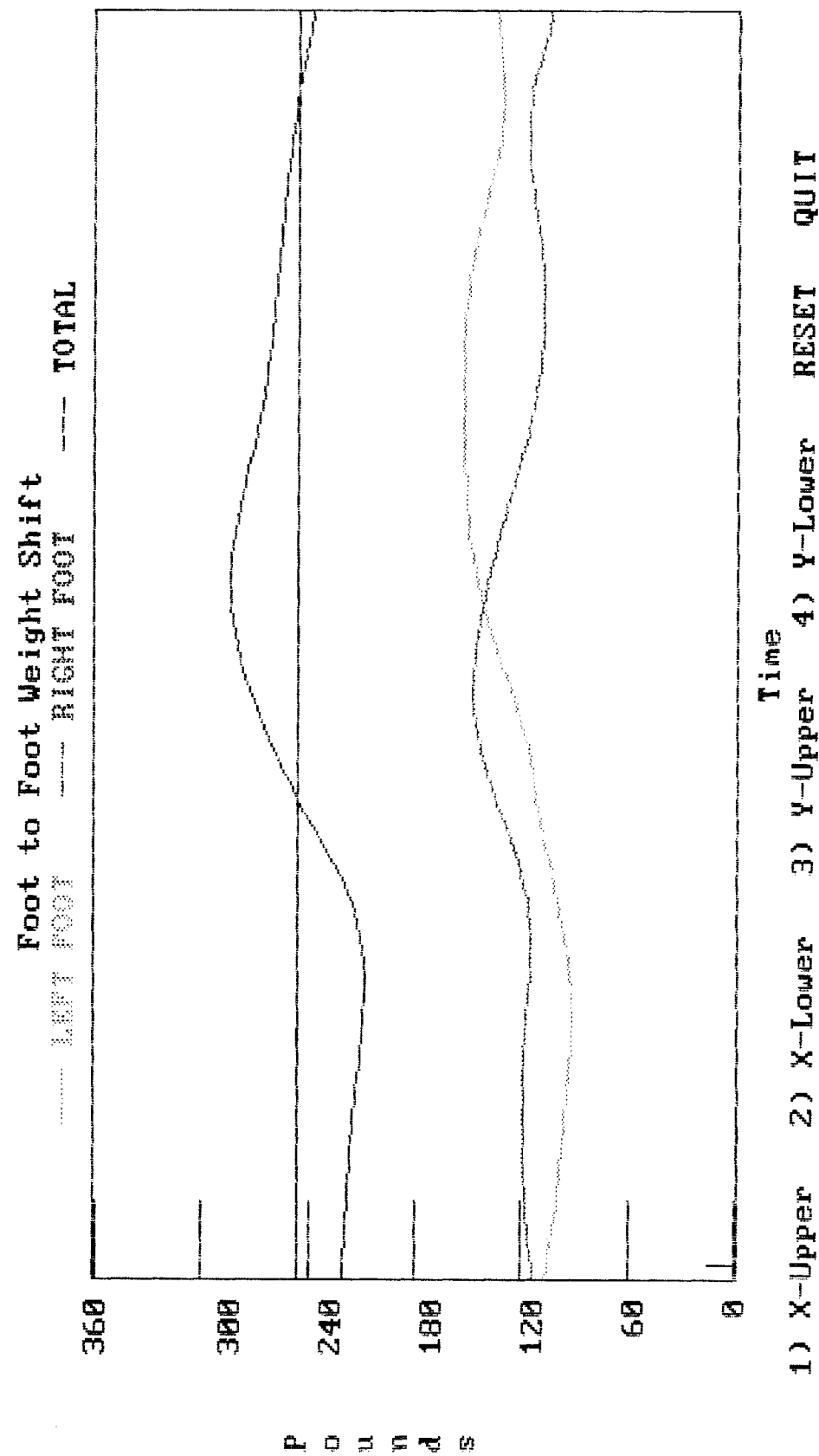
Figure 12:
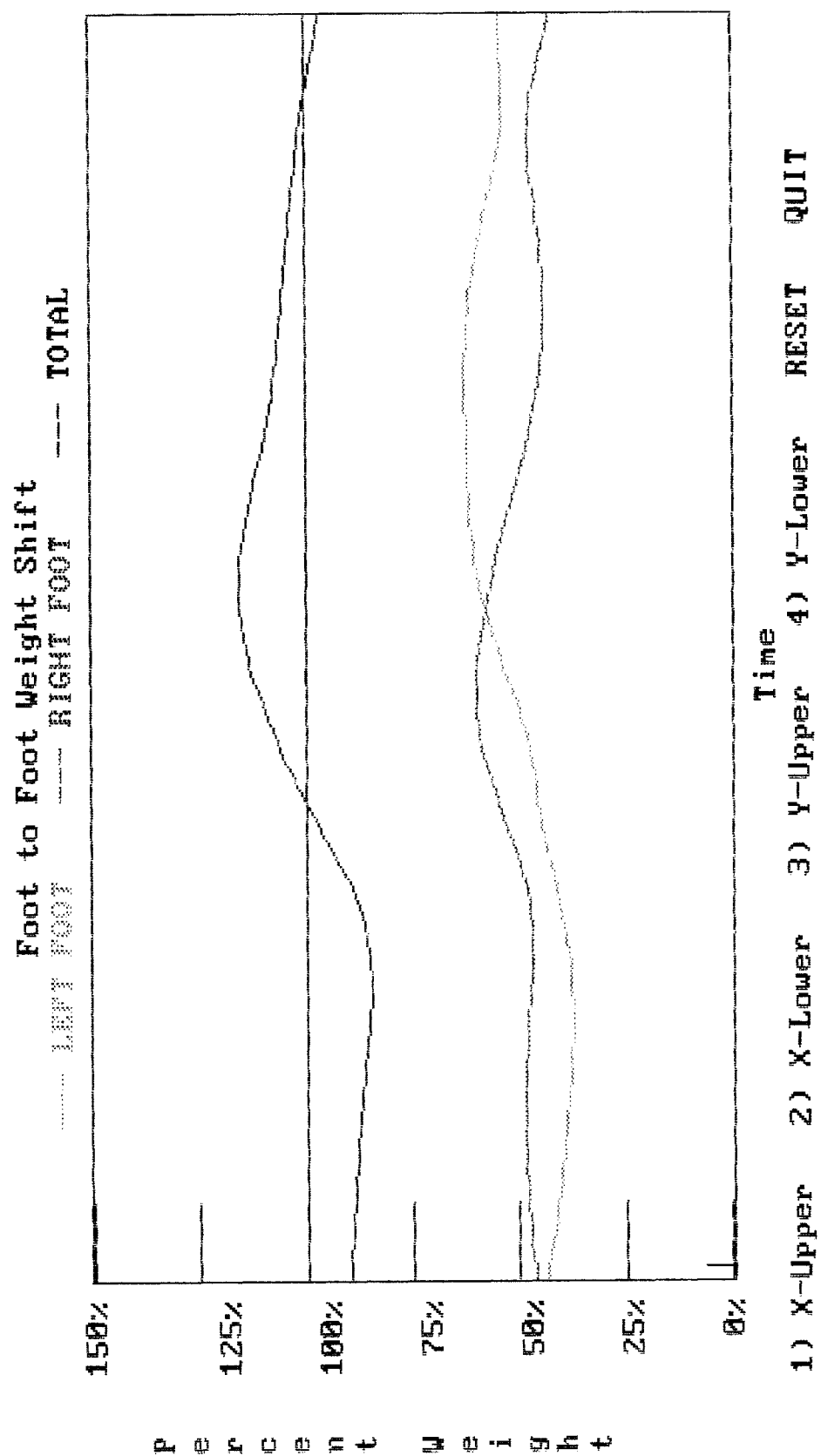
Figure 13:
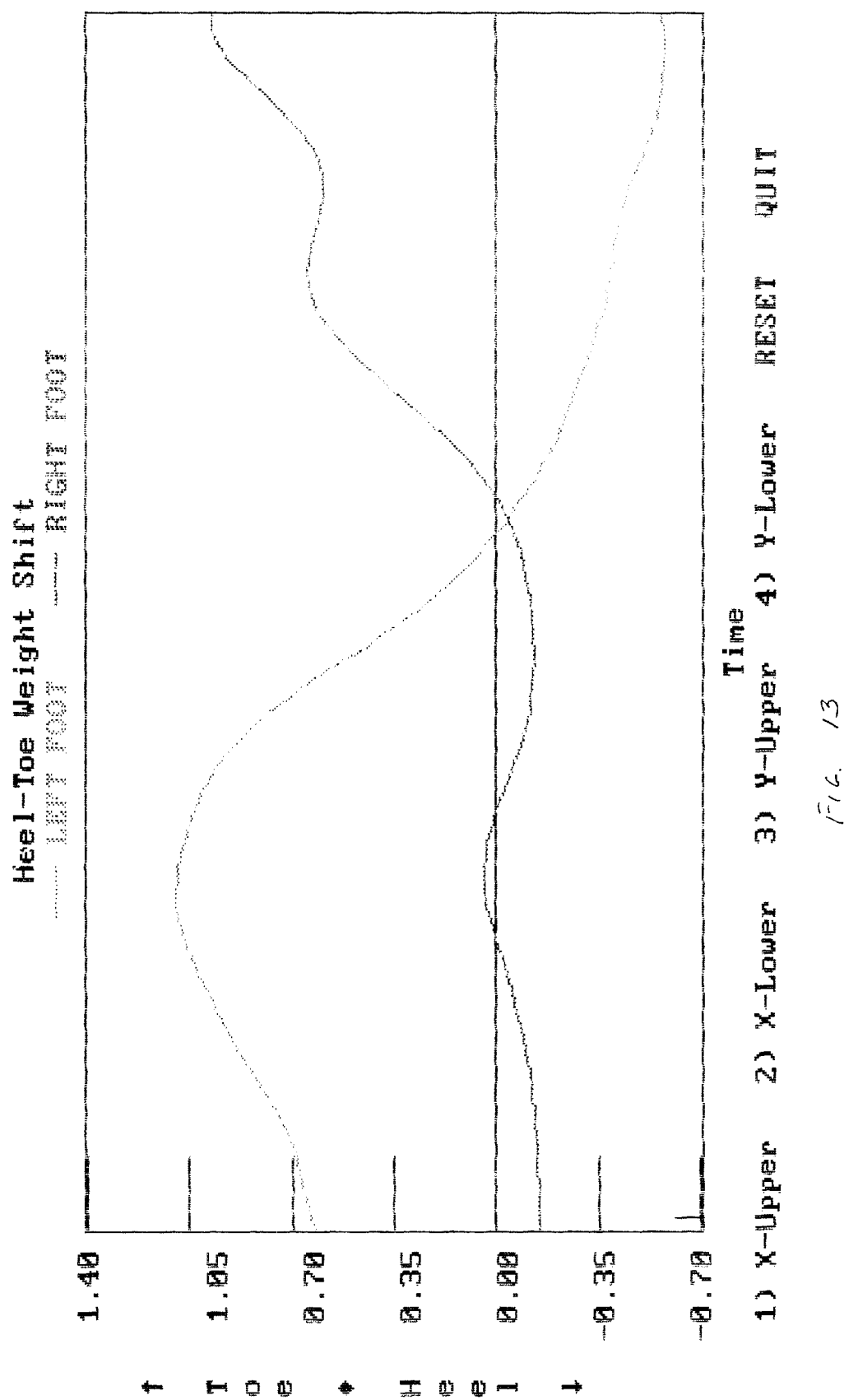
Figure 14:
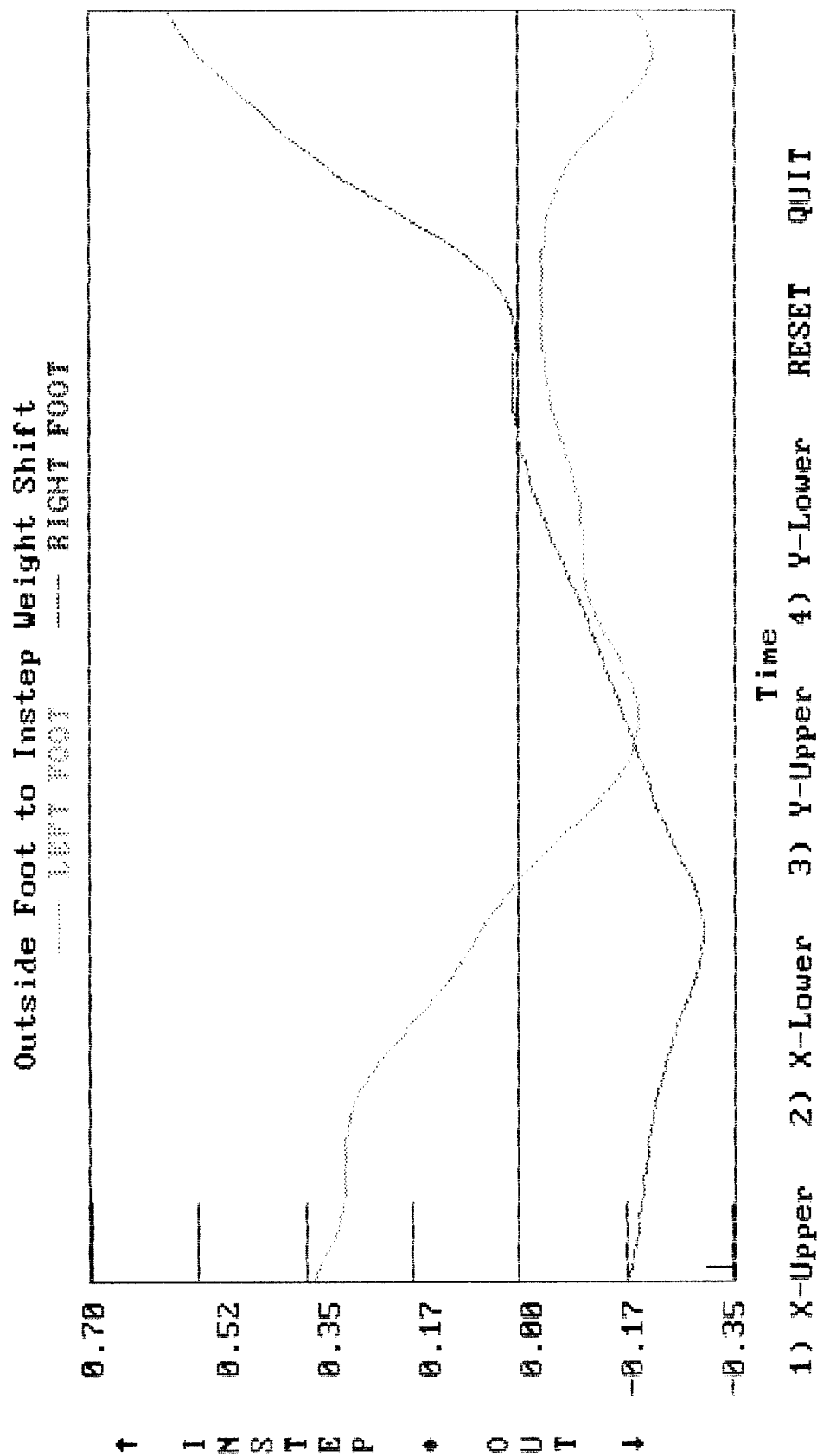
Figure 15:
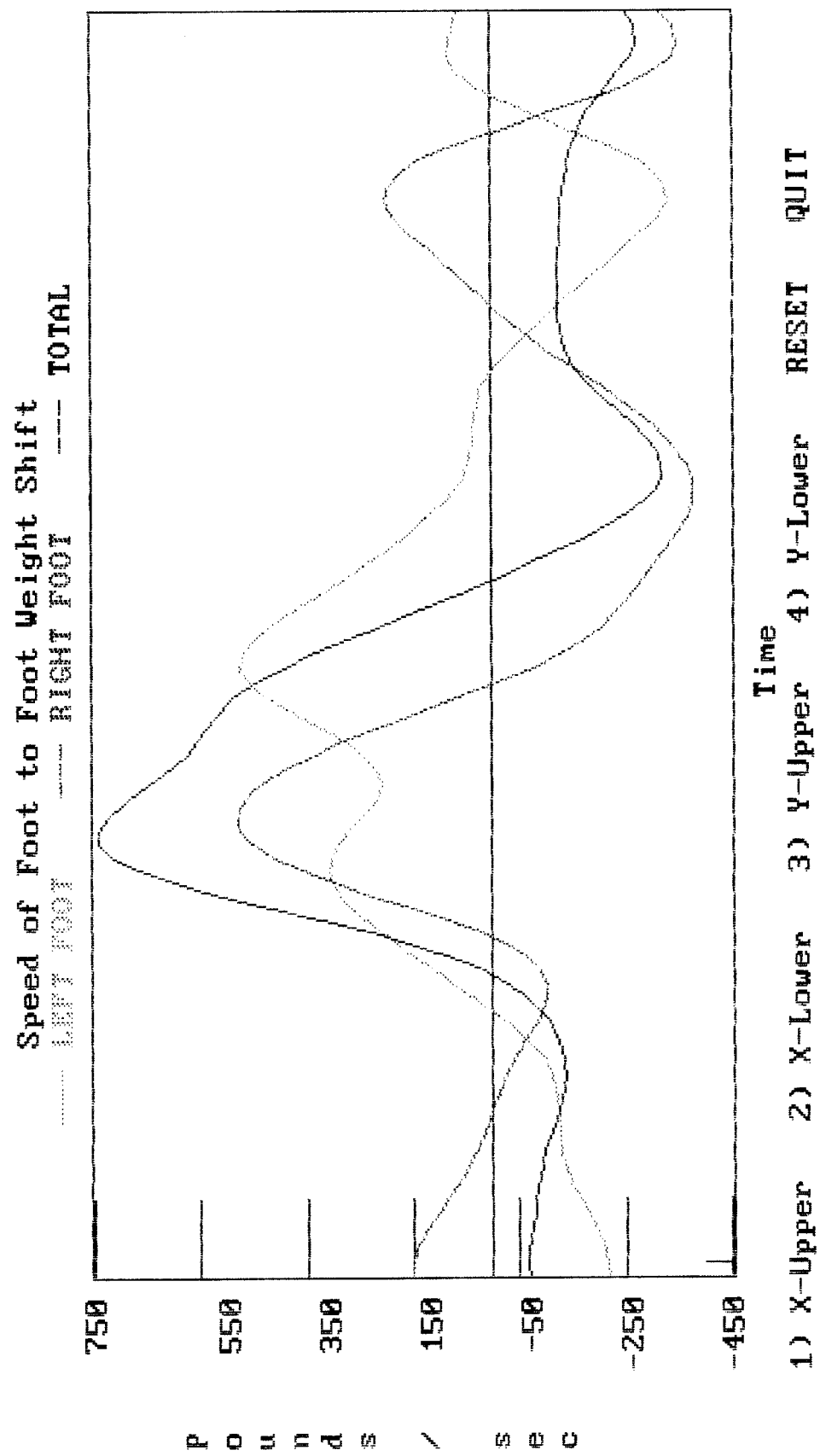
Figure 16:
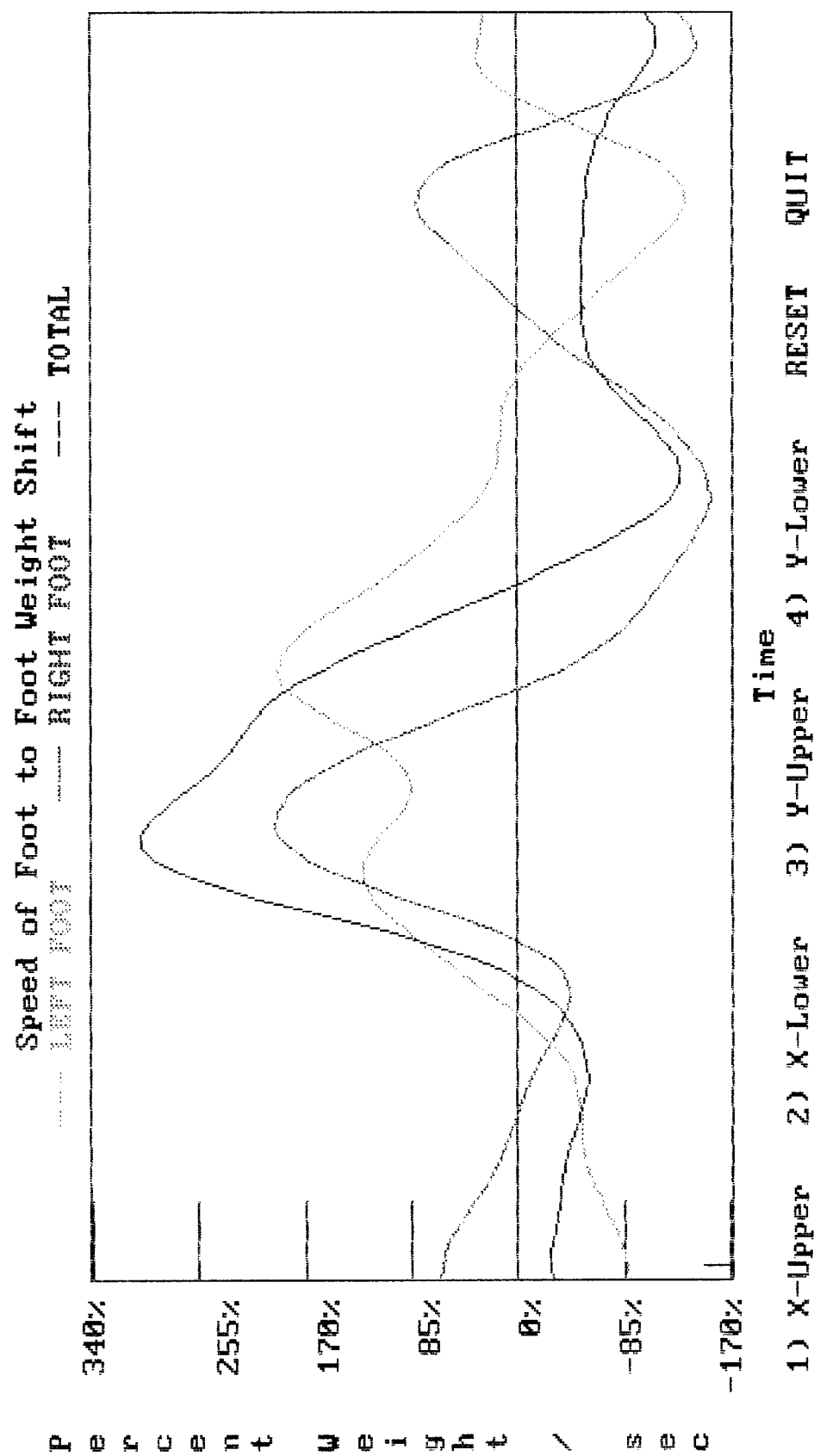
Figure 17:
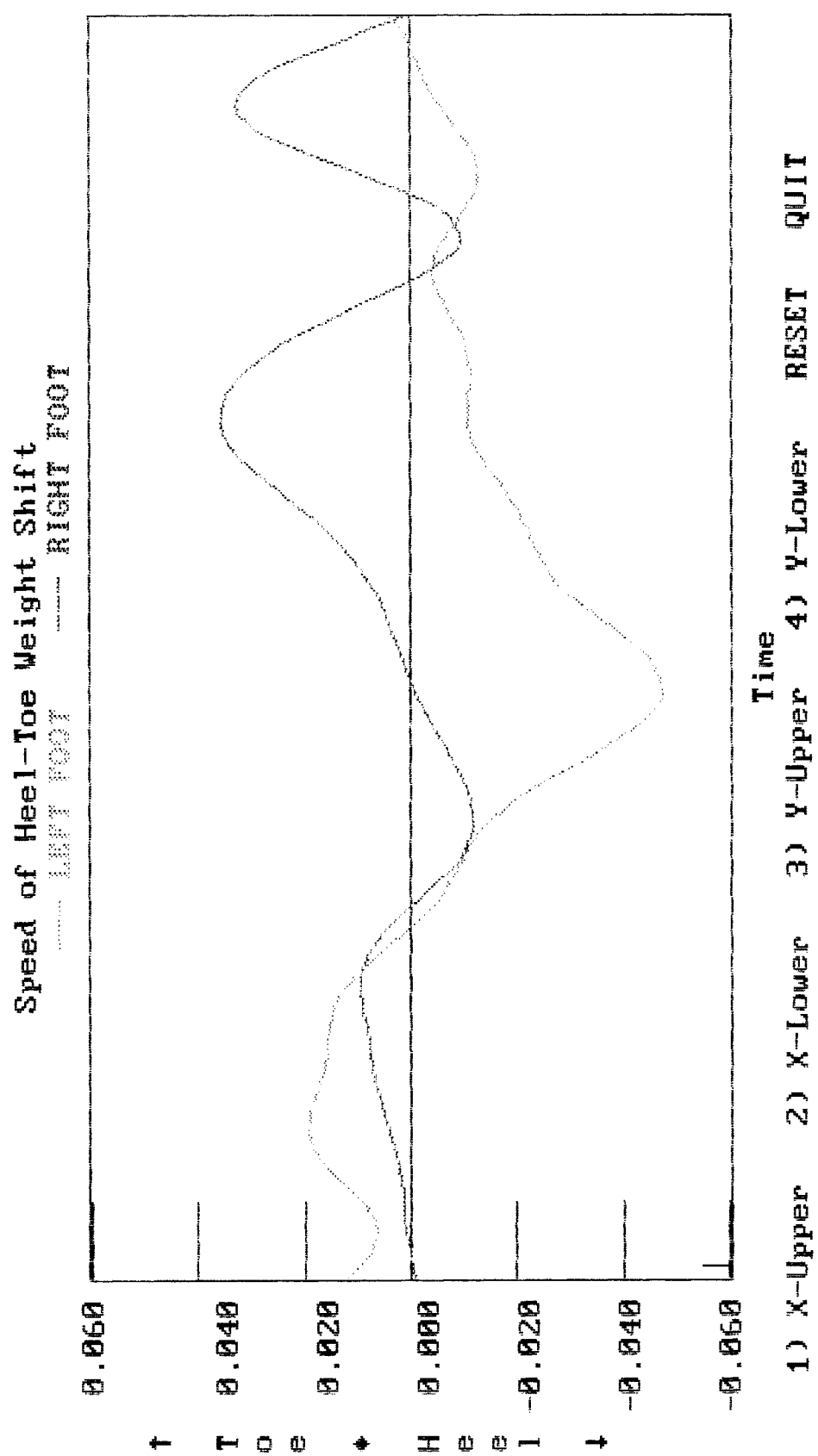
Figure 18:
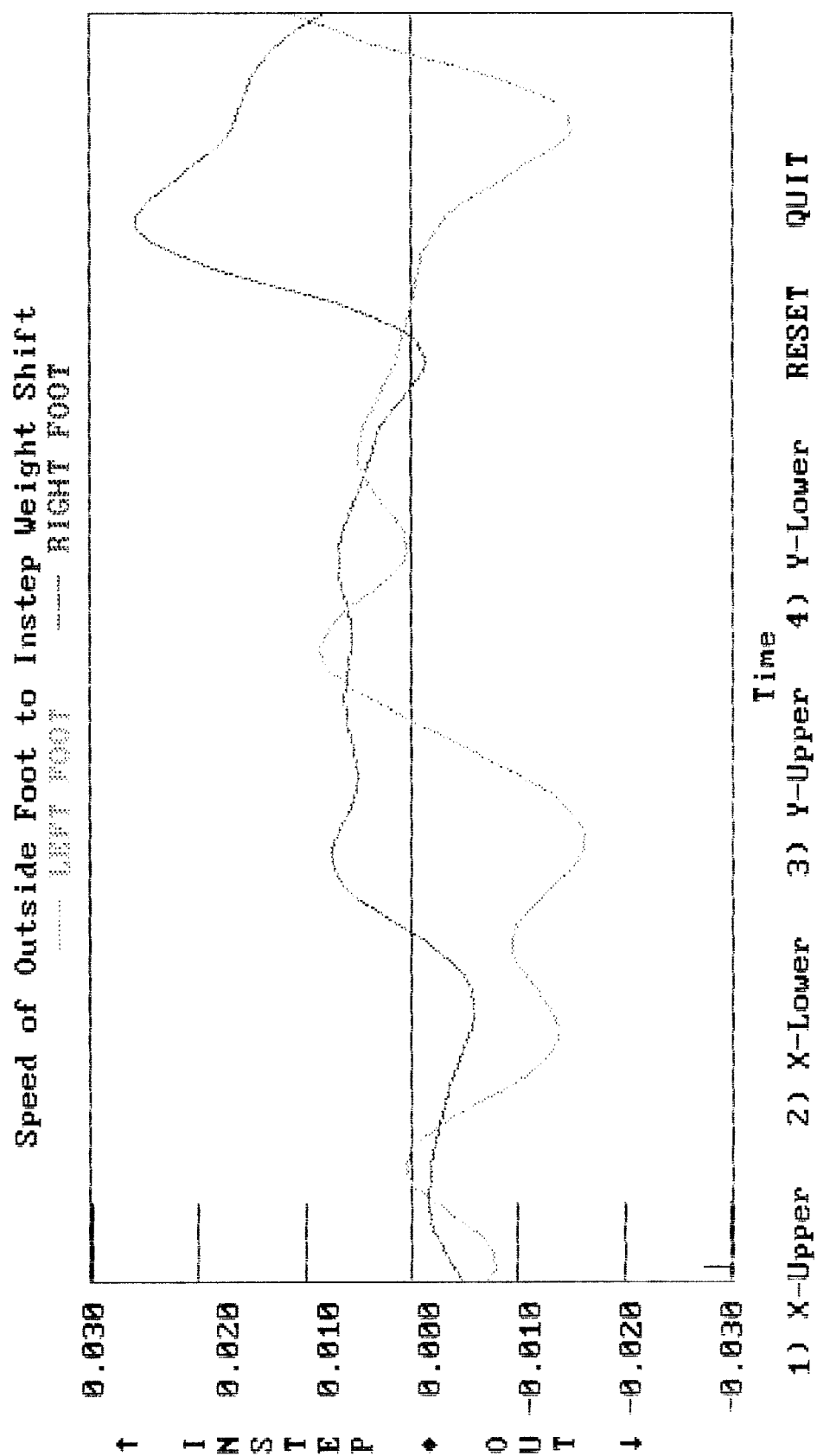

FIG. 5 schematically illustrates partial connections between the foot plates of FIG. 1 and a data acquisition board of a central processing unit in accordance with the invention;

FIG. 6 illustrates a schematic diagram of the circuitry and components used in the synchronous trigger unit of FIG. 1;

FIG. 7a graphically illustrates an input signal to the synchronous trigger unit of FIG. 1;

FIG. 7b graphically illustrates another input signal to the synchronous trigger unit of FIG. 1;

FIG. 7c graphically illustrates the output signal from the synchronous trigger unit of FIG. 1;

FIG. 8 illustrates a perspective view of the top plate of the force plate of FIG. 2 identifying and locating the relevant forces;

FIG. 9 illustrates a side view 1 of FIG. 8 used to develop the expressions for heel-to-toe weight shift;

FIG. 10 illustrates a side view 2 of FIG. 8 used to develop the expressions for outside-instep weight shift;

FIG. 11 graphically illustrates a foot-to-foot weight shift over time on the force plates of FIG. 1;

FIG. 12 graphically illustrates a foot-to-foot weight shift as a percentage of the total static weight over time as graphically presented by the system;

FIG. 13 graphically illustrates a heel-to-toe weight shift on a foot plate over time as measured in accordance with the invention;

FIG. 14 illustrates an outside-to-instep weight shift over time as measured in accordance with the invention;

FIG. 15 graphically illustrates the speed of a foot-to-foot weight shift over time as recorded by the system;

FIG. 16 illustrates the speed of a foot-to-foot weight shift as a percent of total static weight over time;

FIG. 17 illustrates the speed of a heel-to-toe weight shift as measured in accordance with the invention; and FIG. 18 illustrates the speed of an outside-to-instep weight shift in accordance with the invention.

Figure 19:
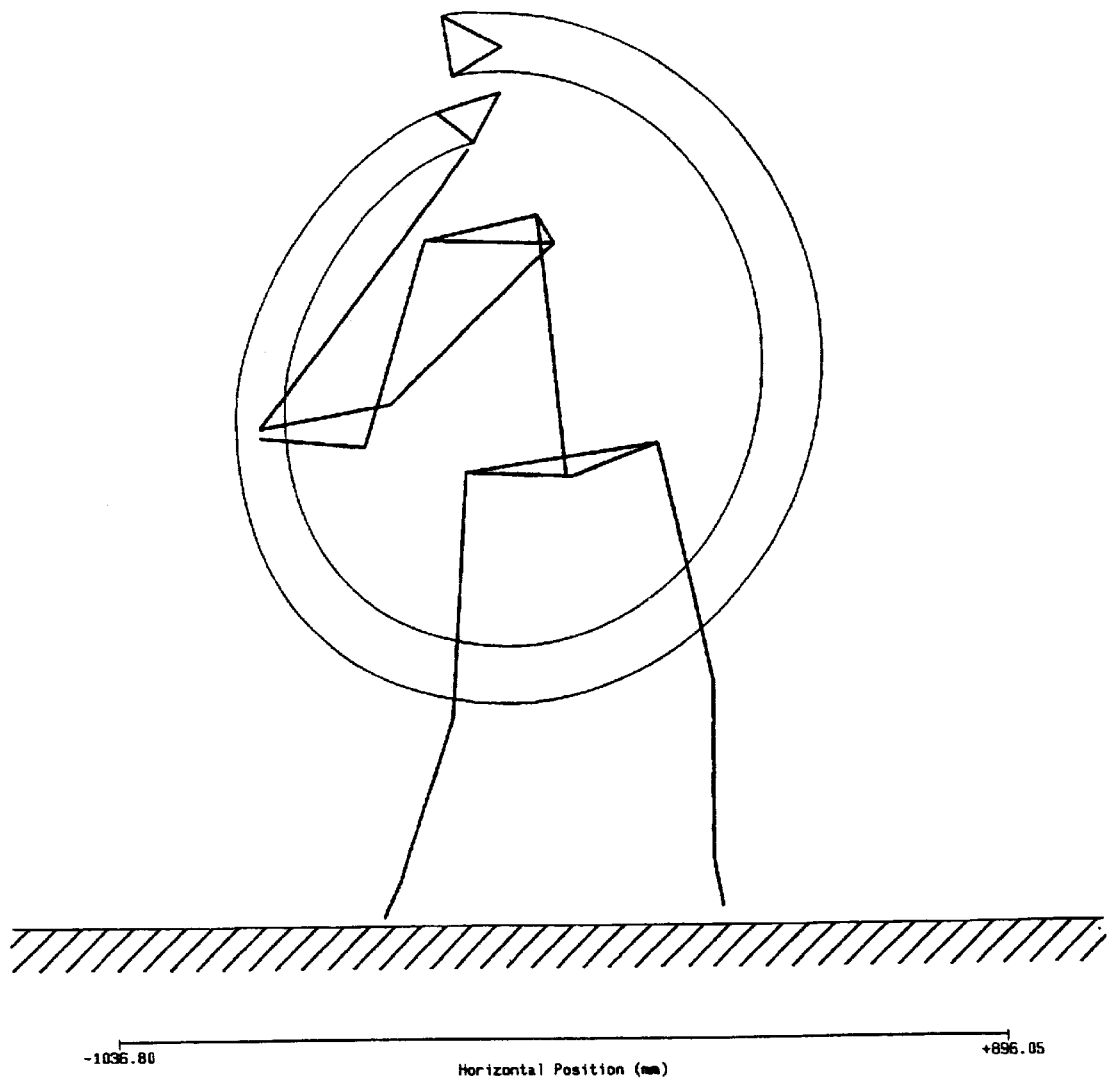

FIG. 19 illustrates video data of a golf swing as collected and processed by the motion analysis system.

Figure 20:
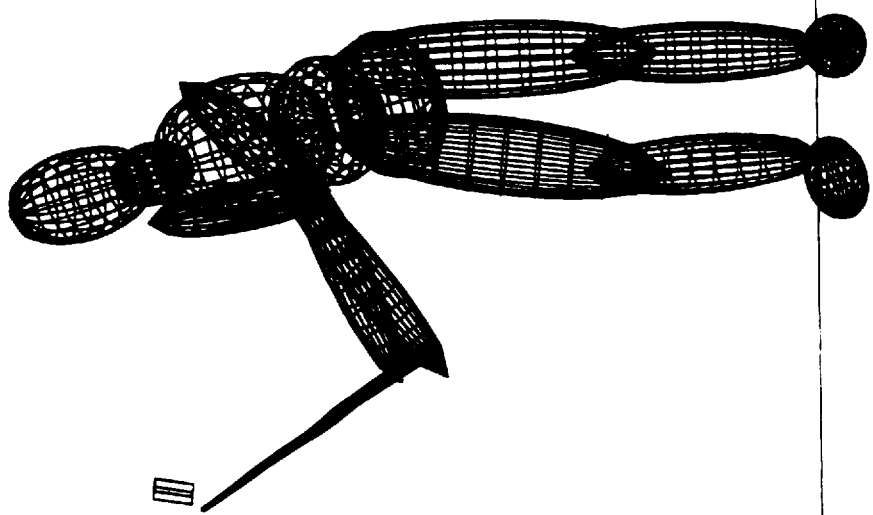

FIG. 20 graphically illustrates a computer android model performing a golf swing that was recorded with the force plate data aquisition system and the motion analysis system.

Referring to FIG. 1, the system for analyzing a golf swing employs a motion analysis system 10, for example as described in copending patent application "Method of and System for Analyzing a Golf Swing," Ser. No. 08/344,725, filed Nov. 23, 1994. In addition, the system employs a force plate data acquisition system including a pair of force plates 11 and a central processing unit 12 which is connected to the motion analysis system 10 and each of the force plates 11 via suitable lines 13, 14, 15, 33. In addition, a monitor 16 which possesses a computer screen 32, is connected to the processing unit 12 for the purposes as described below. Still further, a synchronizing trigger 17 is interconnected between the motion analysis system 10 and the central processing unit 12 in order to operate the force plates 11 simultaneously with the motion analysis system 10.

The motion analysis system 10 is constructed so as to take various video measurements of the actual swing of a golfer and to develop an android computer model of the golfer including an analysis of the forces and motions of the various joints of the android model.

Figure 3:
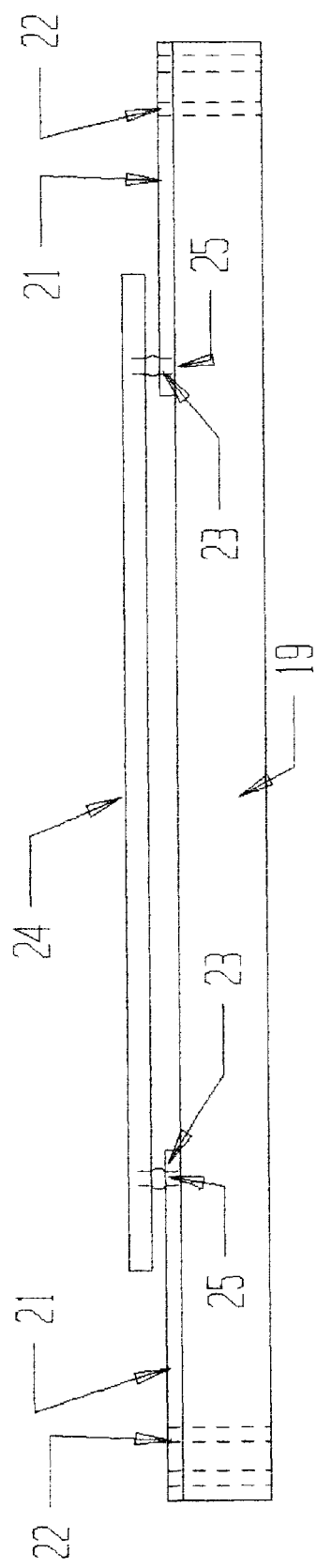
FIG. 3 illustrates a side view of a force plate of FIG. 2.

Referring to FIGS. 2 and 3, each force plate 11 includes a rigid frame, e.g. of rectangular shape formed of two side rails 19 and a pair of end rails 20, each of which is made of any suitable material such as steel or aluminum. In addition, each end rail 20 carries a pair of beams 21 so that each pair of beams 21 extends from one side of the frame 19, 20 toward the opposite side of the frame 19, 20. Each beam 21 is fixedly secured to a respective end rail 20 via a pair of bolts 22 such that each beam 21 is mounted in a cantilevered manner.

As indicated in FIG. 3, each beam 21 carries a ball bearing 23 near the free end to receive a top plate 24 thereon. To this end, each beam 21 has an aperture 25 (FIG. 4) near the free end to receive the ball bearing 23 in a recessed manner. In a similar fashion, the underside of the top plate 24 may be provided with recesses to receive the respective ball bearings 23. In this way, a vertical load on the plate 24 can be transferred directly via the ball bearings 23 to the respective cantilevered beams 21 thus closely simulating a point loading that is perpendicular to the beam 21 (FIG. 8).

Referring to FIGS. 2 and 3, the top plate 24 may be provided with apertures 26 in the top surface for alignment with the ball bearings 23. In addition, the top plate 24 may be provided with a rubber tread or the like 27 for foot placement.

The construction of each foot plate 11 is such that a downward force exerted on the top plate 24 is transferred directly via the ball bearings 23 to the four cantilevered beams 21 which, in turn, deflect under the load.

Figure 4:
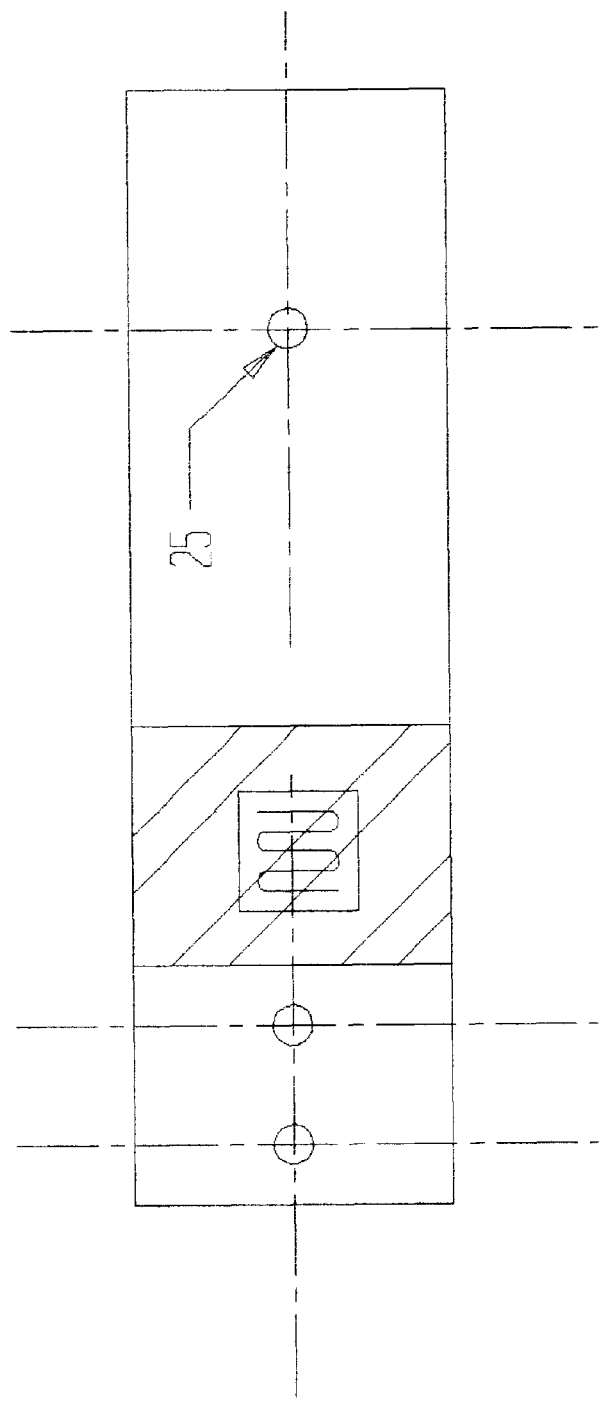
FIG. 4 illustrates two views of a cantilever beam of FIG. 2.

Referring to FIGS. 2 and 4, a sensing means 28, 28' is provided adjacent each beam 21 for sensing a deflection of the beam 21 and emitting a voltage signal indicative of the sensed deflection. To this end, the sensing means 28, 28' is in the form of strain gauges disposed above and below each respective beam 21 in order to measure deflection of the beam 21.

It is preferable that the strain gauges 28, 28' be secured to the beams 21 near the connection with the respective end rails 20 where the beams 21 experience the maximum strain. The gauges 28, 28' should be placed on the longitudinal axis of the beams 21 and oriented to sense the deflection from the bending of the beams 21.

Each pair of strain gauges 28, 28' comprises one-half of a Wheatstone bridge. This gauge configuration has two benefits. First, the gauge configuration doubles the magnitude of the reading relative to a single gauge configuration and second, the gauge configuration ignores actual deflection caused by temperature effects.

It is preferable that the strain gages 28, 28' be wired to a terminal strip connector 33 (FIG. 2) where they are joined with stronger cables 14, 15 (FIG. 1) to help prevent damage to the strain gages 28, 28'.

Referring to FIG. 5, a data cable 29 connects the strain gauges 28, 28' of each foot plate 11 to a strain gauge data acquisition board 30 inserted in the central processing unit 12, for example, an IBM-PC or PC compatible computer.

As indicated in FIG. 5, each force plate 11 has a suitable board 31 connected to the respective strain gauges (not shown) so as to receive and transfer voltage signals from the respective strain gauges via the cable 29 to the strain gauge data acquisition board 30 of the central processing unit 12.

The strain gauge data acquisition board 30 is provided with a plurality of analog/digital converters (not shown) for transforming the analog voltage signals from the strain gauges into discrete binary numbers at a predetermined time rate. The processing unit 12 stores the binary number data received from the strain gauge data acquisition board 30. The processing unit 12 contains a BASIC program to convert the stored binary numbers to beam reaction forces.

More specifically, the central processing unit 12 is provided with three programs written in BASIC in order to calibrate and run the force plate data acquisition system and process the data. Program CALIB.BAS aids in the collection of calibration data for each of the beams 21 of the foot force plates 11 so that the correlation between the binary numbers and beam reaction forces can be made. Program PLATE.BAS is used to run and control the strain gauge data acquisition process of the data acquisition board 30. This program also zeros the signals from the data acquisition board when the force plates 11 are unloaded to reflect the unloaded state. In addition, the program collects the binary data from the data acquisition phase and writes the data to a binary file. The program GRAPH.BAS converts the binary data to beam reaction forces using the calibration data. This program serves as a means to process the beam reaction force data to determine such quantities as total vertical reaction forces, foot-to-foot weight shift, heel-to-toe weight shift and outside-to-instep weight shift. In addition, this program serves as a means to determine the speed at which the vertical reaction forces and the weight shifts take place by taking a first derivative. In addition, the program is used to plot the resulting vertical reaction force and weight shift curves on a computer screen 32 of the monitor 16 (see FIG. 1).

The strain gauge data acquisition board 30 fits in an expansion slot in the CPU 12 and has eight channels for collecting strain readings from eight cantilever beams 21. Each channel on the board 30 represents one Wheatstone bridge. All channels have the following configuration; two strain gauges 28, 28' on each beam 21 make up one-half of a Wheatstone bridge circuit; two on-board high-precision fixed resistors complete the bridge; the board 30 supplies 5 VDC to the bridge. The board 30 has an analog-digital converter for transforming the analog voltage readings taken from the bridges into discrete binary numbers. BASIC programs collect the binary readings and use calibration equations to relate the binary numbers to a force.

The foot plate system can collect data either independently or synchronously with the Motion Analysis System 10 (MAS). Synchronous data collection allows direct correlation of foot force data with video data. The data acquisition board 30 has a connection for the external synchronizing trigger 17 so as to receive a timing signal from the external trigger 17 to allow for synchronous data collection with the MAS 10.

The MAS outputs an A/D gated strobe timing signal that coincides with the collection of video data (FIG. 7a). In addition, the MAS 10 outputs an A/D strobe timing signal that cycles at ten times the rate of video data collection (FIG. 7b). The sync trigger 17 has a circuit (FIG. 6) which receives these two timing signals from the MAS 10, processes them, and sends the resulting signal (FIG. 7c) to the strain gauge data acquisition board 30 in the CPU 12. The board 30 reads one channel whenever the trigger signal goes low. The channels are sampled in a serial manner, thus eight low signals are required to obtain a complete set of strain gage data from the plates 11. The additional two low signals shown in FIG. 7c are ignored. The group of low signals are initiated by the video data collection signal (FIG. 7a) from the MAS 10, thus the foot plate and video data are synchronized.

Theory of Operation

The basis for operation of the foot force plates is the linear relationship between a perpendicular point load and a corresponding deflection of a cantilever beam as given by the following equation:

$$Y = -\frac{FL^3}{3EI} \tag{1}$$

where Y is the deflection at the point of the applied load F, L is the length of the beam from the support to the point of application of the load, E is the modulus of elasticity of the material of the beam, and I is the area moment of inertia of the cross-section of the beam. The quantities L, E, and I remain constant for the beams 21. The ball bearings 23 placed near the end of the beams 21 ensure that only point vertical (perpendicular) forces F are transmitted to the beams 21 from a load applied to the top plate 24. Therefore from Eqn (1), as long as the loading does not cause the stress in the beam material to exceed the elastic limit, the deflection and loading are linearly related.

Strain gauges 28, 28' mounted above and below each beam 21 and wired in a Wheatstone bridge circuit configuration, measure deflection of the beam 21 as a proportional change in voltage (analog signal). The analog-digital converter on the strain gauge data acquisition board 30 transforms analog voltages obtained from the Wheatstone bridge into discrete binary numbers (digital signal) and calibration equations relate the binary numbers to beam reaction forces.

The beam reaction forces can be manipulated using standard methods of mechanics to determine the total vertical reaction force, foot-to-foot weight shift, heel-to-toe weight shift, and outside-to-instep weight shift.

Since force collection occurs at constant time intervals, reaction force and weight shift data can be numerically differentiated to obtain the rate of change of these quantities over time.

Total Vertical Reaction Force and Foot-to-Foot Weight Shift

Referring to FIG. 8, one plate 11 (plate 1) measures beam reaction forces designated as $R_A$, $R_B$, $R_C$ and $R_D$ and the other plate 11 (plate 2—not shown) measures beam reaction forces designated as $R_E$, $R_F$, $R_G$ and $R_H$. The total vertical force on each plate is found by summing the four beam reaction forces for the respective plate yielding:

$$F1 = R_A + R_B + R_C + R_D \qquad (2)$$

$$F2 = R_E + R_F + R_G + R_H \qquad (3)$$

Summing F1 and F2 gives the total vertical force (Ftot) exerted by the golfer:

$$Ftot = F1 + F2 \qquad (4)$$

Plots of Equations (2) through (4) (FIG. 11) indicate the golfer's foot-to-foot weight shift (F1 versus F2) during a swing and the total vertical force (Ftot) he exerts on the ground. The horizontal line coincides with the golfer's static weight. (Note that all of the plots are for the same swing from a golfer who is right handed. The data is plotted from approximately one-half second before impact to one-half second after impact.)

Equations (2) through (4) represent absolute forces. It is also informative to calculate foot-to-foot weight shift and total vertical force as a percentage of the golfer's static weight thus normalizing the data for comparison purposes. An assumption is made that the golfer is not moving the instant data collection begins, therefore the first frame of data is used to determine the golfer's static weight (Fstat) using Equations (2) through (4). Thus F1, F2, and Ftot represented in normalized form become:

$$F1norm = (F1/Fstat)*100 \qquad (5)$$

$$F2norm = (F2/Fstat)*100 \qquad (6)$$

$$Ftot\text{-}norm = (Ftot/Fstat)*100 \qquad (7)$$

A plot of Equations (5) through (7) (FIG. 12) illustrates normalized foot-to-foot weight shift and total vertical force data from FIG. 11. The horizontal line coincides with the golfer's static weight.

Heel-to-Toe and Outside-to-Instep Weight Shift

The determination of heel-to-toe and outside-to-instep weight shifts is based on treating the top plate 24 of each foot plate 21 as a simply supported rigid beam. For example, to determine the heel-to-toe weight shift on plate 1, view 1 is taken from FIG. 8 and is shown by FIG. 9. In this view, the top plate 24 assumes a beam configuration with left simple support Rc+Rd and right simple support Ra+Rb. If "stat" is used to designate values when data collection is initiated, and a is the location from the left end to the total vertical force on plate 1 (F1), then simple static moment balances about point A yield the following expressions:

$$a_{STAT} = \{(Ra+Rb)stat * La\}/(Ra+Rb+Rc+Rd)stat \qquad (8)$$

$$a = \{(Ra+Rb) * La\}/(Ra+Rb+Rc+Rd) \qquad (9)$$

where La is the length of the top plate 24 in this view.

The change in length of the moment arm (a) relative to $a_{STAT}$ is an indication of the heel-to-toe weight shift and is represented as:

$$\text{HEEL-TO-TOE WEIGHT SHIFT} = (-a_{STAT} - a)*S \qquad (10)$$

where S can be used to scale the result. The inclusion of $-a_{STAT}$ in Eqn (10) normalizes the calculation so that it is independent of the initial foot placement. FIG. 13 is a plot of Eqn (10) illustrating the heel-to-toe weight shift for each foot during a golf swing. The horizontal line represents the normalized initial placement of each foot in the heel-to-toe direction. Points above the line represent weight shifting towards the toe while points below the line represent weight shifting towards the heel.

Calculating the outside-to-instep weight shift follows a similar procedure to that for the heel-to-toe weight shift. View 2 of FIG. 8 is taken and is shown by FIG. 10. The top plate 24 assumes a beam configuration with left simple support Ra+Rd and right simple support Rb+Rc. Designating b as the location from the left end to the total vertical force on plate 1, then simple static moment balances about point B yield the following expressions:

$$b_{STAT} = \{(Rb+Rc)stat*Lb\}/(Ra+Rb+Rc+Rd)stat \qquad (11)$$

$$b = \{(Rb+Rc)*Lb\}/(Ra+Rb+Rc+Rd) \qquad (12)$$

where Lb is the length of the top plate 24 in this view.

The change in length of the moment arm (-b-) relative to $b_{STAT}$ is an indication of the outside-to-instep-toe weight shift and is represented as:

$$\text{OUTSIDE-TO-INSTEP WEIGHT SHIFT} = (b_{STAT} - b)*T \qquad (13)$$

where T can be used to scale the result. As before, the inclusion of $b_{STAT}$ in Eqn (13) normalizes the calculation so that it is independent of the initial foot placement. FIG. 14 is a plot of Eqn (13) illustrating the outside-to-instep weight shift for each foot during a golf swing. The horizontal line represents the normalized initial position of each foot in the outside-to-instep direction. Points above the line represent weight shifting towards the instep while points below the line represent weight shifting towards the outside.

Rate of Change (SPEED) Of Weight Shifts

Taking the derivative with respect to time of total vertical reaction force and weight shift data yields the speed at which each occurs. This derivitive is an indication of how quickly the golfer shifts his body weight and moves his feet during a swing.

It is necessary to smooth the weight shift data prior to numerical differentiation because the force sensitivity of the foot plates 11 is low relative to the data collection speed. The chosen smoothing routine operates on an array of ordinates (weight shift data) that are in order of increasing abscissas (time) and assumes that values on the abscissa are in order and equally spaced. The routine removes any linear trend in the data then uses a Fast Fourier Transform to low-pass filter the data. Any linear trend removed is reinserted after filtering. The degree of smoothing is specified by the user in the program GRAPH.BAS. No smoothing yields excessively noisy derivatives while over smoothing renders the speed curves virtually featureless. (A detailed description of the smoothing routine is found in Press, W. H., Flannery, B. P., Teukolsky, S. A., Vetterling, W. T., 1986, Numerical Recipes. Cambridge University Press, New York, pp. 390–6, 495–7.)

After smoothing, the data is numerically differentiated using a standard forward difference technique with error order $t^2$:

$$y'_i = \frac{-y_{i+2} + 4y_{i+1} - 3y_i}{2t} \qquad (14)$$

where $y'_i$ is the rate of change of the data, $Y_i$ is the smoothed data, and t is the data collection speed in seconds.

Performing numerical differentiation on the curves of FIGS. 11 through 14 yields the speed of weight shift curves shown in FIGS. 15 to 18. The horizontal line in each FIG. indicates zero change in weight shift. For speed of foot-to-foot weight shift (FIGS. 15 and 16), points above the line represent how quickly the vertical reaction force increases on the foot while points below the line indicate how quickly it decreases. FIG. 15 is in absolute force units while FIG. 16 is given as a percent of the static weight of the golfer. FIG. 17 is a plot of the speed of heel-to-toe weight shift. Points above the line represent the speed with which the weight shifts toward the toe and points below the line indicate how quickly the weight shifts toward the heel. A plot of the speed of outside-to-instep weight shift is given by FIG. 18. Points above the line represent how quickly the weight shifts toward the instep while points below the line indicate the speed of weight shift toward the outside.

Analysis of the plots (FIGS. 11 through 18) yield considerable insight into how the golfer shifts his body weight and moves his feet during a golf swing. For example, an analysis of FIG. 12 shows how the golfer transfers his weight from his right foot to his left foot as the swing moves through impact. An interpretation of the curves indicates that more weight shifting between the feet would be beneficial. The top curve (total reaction force) highlights the effect of centrifugal forces from the club in increasing the total downward force from the golfer. Since this figure presents the data in normalized form, it is possible to compare this golfer's weight shift patterns and characteristics with other golfers. Looking at the heel-to-toe weight shift (FIG. 13) and the outside-to-instep weight shift, it is possible to visualize the motion of the feet in these directions. Any undesirable or incorrectly timed movements can be easily identified and thus corrected with proper instruction or possible new or redesigned equipment. Because of the quick feedback provided by the system, instruction effectiveness and/or equipment changes can easily be evaluated. The speed figures (FIGS. 15 through 18) give indications of how quickly and smoothly the weight shifts and foot movements take place. For example, FIG. 16 shows how quickly the feet load and unload through impact and FIG. 18 indicates that the right foot has smoother motion than the left foot in the outside-to-instep direction.

In synchronous data collection mode, video information is provided by the motion analysis system 10 that coincides with the weight shift data. This video information is provided in the form of a display as shown in FIG. 19 in accordance with information obtained as described in said pending application Ser. No. 08/344,725. This yields additional insight as to the relationships between body position and weight shift characteristics. Still further, a golf swing recorded with the force plate data acquisition system 11, 12 and the motion analysis system 10 can be used to drive a computer android model of a golfer as is shown in FIG. 20. This android model is further described in said pending application Ser. No. 08/344,725. The model yields considerable information as to the joint forces, torques, and motions experienced by the golfer during a swing. This capability allows for a comprehensive biomechanical analysis of a golfer.

Procedure

The procedure for using the foot force plate data acquisition system consists of three parts; 1) calibration, 2) data collection, and 3) post-processing of results. The following addresses each part.

Calibration

The force plate data acquisition system does not require calibration prior to every use, however periodic calibration is a sound practice. Calibration of the force plate system should be performed whenever the following occurs; the readings become suspect, the system has not been used for sometime, the system is damaged, or a large environmental change has occurred.

It is necessary to calibrate each beam 21 of the foot plates 11 individually to allow for the accurate calculation of the heel-to-toe and outside-to-instep weight shifts. Each of the eight beams 21 has a corresponding calibration equation which relates the beam load to the binary reading obtained from the data acquisition system.

The calibration of each beam is simply a matter of applying incrementally increasing (calibrated) weights and recording the corresponding binary readings. It is important to use the full load range with a sufficiently small load increment. The calibration is done in conjunction with the program CALIB.BAS which samples 1000 binary readings and prints the average to the screen for each applied weight.

A linear curve fit is performed using the calibration data for each beam 21 to solve for the calibration constants (slope and Y-intercept). (Non-linear calibration data usually indicates a hardware problem such as a loose connection, broken wire, or a bad strain gauge.) The constants are entered into the program GRAPH.BAS thus completing the calibration procedure.

Data Collection

The procedure begins with the golfer locating the plates 11 such that each foot is placed at or near the center of each top plate 24 while assuming a normal stance. The plates 11 are designed to accept the feet oriented with the long dimension of the feet closely lining up with the long dimension of the top plates 24. The golfer may place either foot on either plate 11 as the controlling program will adjust accordingly.

Data collection is controlled by the program PLATE.BAS. Its first function after the plates have been located is to zero the data acquisition system. Next, the user is prompted for the name of the file to store the raw data, the location of the feet relative to the plates 11 (ex: right foot on plate 1, etc.), and whether independent or synchronous data collection will be used. The golfer then steps onto the plates 11, and starting from a complete rest, may perform a swing.

In unsynchronized mode, data collection is initiated by the user through the central processing unit 12. The central processing unit 12 dictates the maximum speed of data collection by its own internal processing speed. This may be artificially reduced by setting up dummy loops in the PLATE.BAS program. Data collection is terminated when available memory in the central processing unit 12 is filled. In synchronized mode, data collection is initiated and terminated by the MAS 10. The MAS 10 also controls the speed of data collection in conjunction with the sync circuit 17. When data collection is complete, the program stores the raw data in a binary file for later post-processing.

Post-Processing Results

The post-processing of raw data is performed with the program GRAPH.BAS. The user has the option of graphing the reaction force and weight shift curves or sending the numerical data to an ASCII file for processing elsewhere. The program graphs total vertical reaction force (absolute or normalized), foot-to-foot weight shift (absolute or normalized), heel-to-toe weight shift, and outside-to-instep weight shift. In addition, the program provides plots of the speed of each of the aforementioned quantities. When plotting the data, the program allows the user to specify the ranges on X and Y axis.

What is claimed is:

1. An apparatus for measuring ground reaction forces and various weight shifts comprising a pair of force plates, each plate including a rigid frame, two pairs of beams secured in a cantilevered manner to opposite sides of said frame and in facing relation to each other, a plurality of ball bearings, each bearing being disposed on a free end of a respective beam, and a plate mounted on said ball bearings and extending over said beams to receive a foot of a person thereon;

sensing means adjacent each beam for sensing a deflection of said respective beam and emitting a voltage signal indicative of a sensed deflection; and a processing unit connected to said sensing means to receive voltage signals therefrom and to calculate beam reaction forces corresponding thereto.

2. An apparatus as set forth in claim 1 wherein each sensing means includes a pair of strain gauges, one of said gauges being disposed below a respective beam and the other of said strain gauges being disposed above said respective beam arranged such that they measure temperature insensitive deflection thereof.

3. An apparatus as set forth in claim 1 which further comprises a monitor connected to said processing unit for graphically displaying the sum of said beam reaction forces of both force plates per unit of time to visually indicate the total vertical reaction force over time in absolute force units.

4. An apparatus as set forth in claim 1 which further comprises a monitor connected to said processing unit for graphically displaying the sum of said beam reaction forces of both force plates per unit of time relative to the sum of said initial beam reaction forces of both force plates to visually indicate the total vertical reaction force over time in normalized force units.

5. An apparatus as set forth in claim 1 which further comprises a monitor connected to said processing unit for graphically displaying the sum of said beam reaction forces of each force plate per unit of time to visually indicate a foot-to-foot weight shift over time in absolute force units.

6. An apparatus as set forth in claim 1 which further comprises a monitor connected to said processing unit for graphically displaying the sum of said beam reaction forces of each force plate per unit of time relative to the sum of said initial beam reaction forces of both force plates to visually indicate a foot-to-foot weight shift over time in normalized force units.

7. An apparatus as set forth in claim 1 which further comprises a monitor connected to said processing unit for graphically displaying a quantity indicative of the movement of the location of the foot plate vertical reaction force in the heel-to-toe direction as sensed by the difference in the sum of the reaction forces on one pair of beams relative to the opposite pair of beams of each foot plate per unit of time to visually indicate a heel-to-toe weight shift on each foot plate over time.

8. An apparatus as set forth in claim 1 which further comprises a monitor connected to said processing unit for graphically displaying a quantity indicative of the movement of the location of the foot plate vertical reaction force in the outside-to-instep direction as sensed by the difference in the sum of the reaction forces on one pair of opposed beams relative to the other pair of opposed beams of each foot plate per unit of time to visually indicate a outside-to-instep weight shift on each foot plate over time.

9. An apparatus as set forth in claim 1 which further comprises a monitor connected to said processing unit for graphically displaying combinations of said beam reaction forces per unit of time to visually indicate at least one of a total vertical reaction force of a golfer, foot-to-foot weight shift of the golfer, a heel-to-toe weight shift of the golfer's feet, and an outside-to-instep weight shift of the golfer's feet over time.

10. An apparatus as set forth in claim 9 wherein said monitor is connected to said processing means for graphically plotting the speed of a respective one of said reaction forces and of said weight shifts.

11. In a system for analyzing a golf swing, the combination of a pair of force plates, each plate including a rigid frame, two pairs of beams secured in a cantilevered manner to opposite sides of said frame and in facing relation to each other, a plurality of ball bearings, each bearing being disposed on a free end of a respective beam, and a plate mounted on said ball bearings and extending over said beams to receive a foot of a golfer thereon;

sensing means adjacent each beam for sensing a deflection of said respective beam and emitting a voltage signal indicative of a sensed deflection;

a central processing unit having a data acquisition board connected to said sensing means for receiving voltage signals therefrom, said board including a plurality of analog/digital converters for transforming said voltage signals into binary numbers and a BASIC program connected with said converters to calibrate said binary numbers to reaction forces; and a monitor connected to said processing unit for graphically displaying combinations of said beam reaction forces per unit of time to visually indicate at least one of a total reaction forces of a golfer, foot-to-foot weight shift of the golfer, a heel-to-toe weight shift of the golfer's feet, and an outside-to-instep weight shift of the golfer's feet over time.

12. The combination as set forth in claim 11 which further comprises a motion analysis system for analyzing a golf swing and a synchronization trigger connected between said central processing unit and said motion analysis system for controlling said force plates to operate simultaneously with said motion analysis system.

* * * * *